July 9, 1957 T. H. AFFLECK 2,798,688
PLUG VALVE ACTUATOR
Filed June 18, 1954
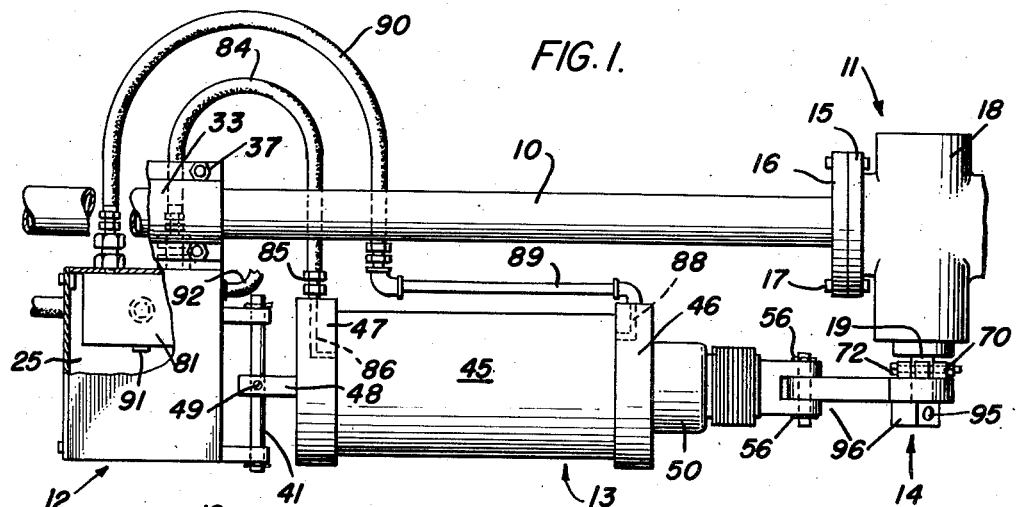
FIG. 1.
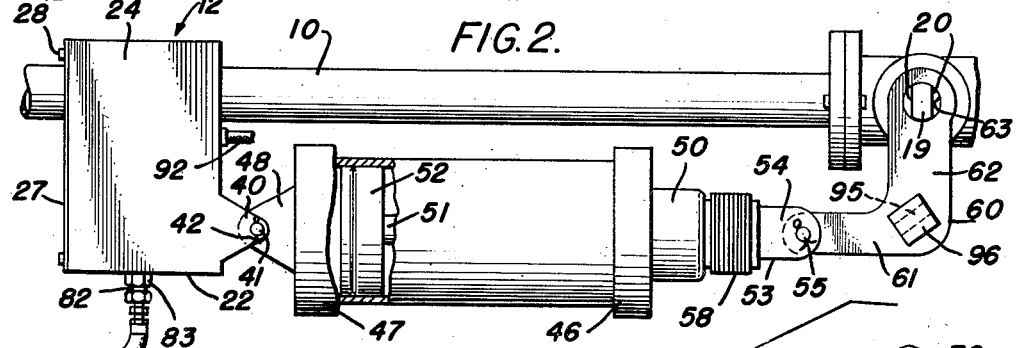
FIG. 2.
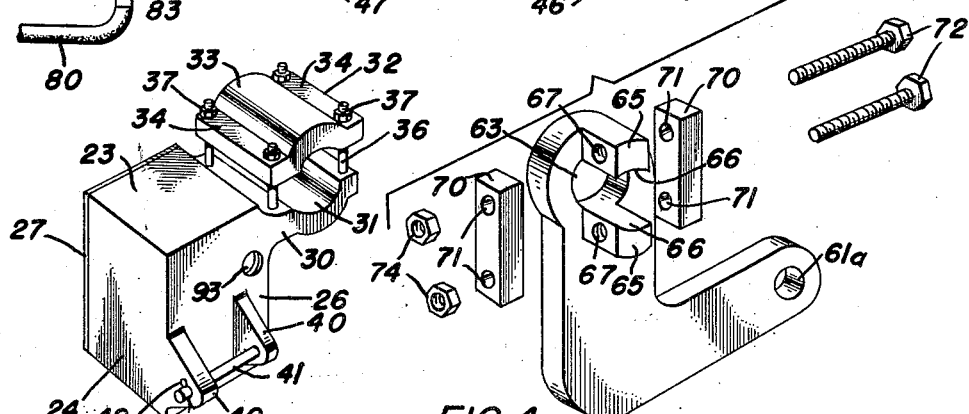
FIG. 3.
FIG. 4.
THEODORE H. AFFLECK
INVENTOR.
BY
Attorney

United States Patent Office 2,798,688
Patented July 9, 1957

2,798,688
PLUG VALVE ACTUATOR

Theodore H. Affleck, North Hollywood, Calif., assignor, by mesne assignments, to Pantex Manufacturing Corporation, Pawtucket, R. I., a corporation of Delaware Application June 18, 1954, Serial No. 437,755

13 Claims. (Cl. 251—30)

This invention relates generally to actuating devices and relates more particularly to valve actuating means.

While the invention has particular utility as an actuator for plug valves, or the like, and is herein described in connection with such valves, it is to be understood that its utility is not confined thereto.

Plug valves have been used in the oil industry and in pipe lines for many years and various means have been employed to operate them. Some of these means are very costly. Not only is the equipment costly, but the installation costs are high due to the large amount of time necessary for making the installations. Other means for operating the plug valves have also been found to be unsatisfactory for one reason or another.

It is therefore an object of the present invention to provide valve actuating means adapted to overcome the above referred to objectable features of actuators for plug valves.

Another object of the invention is to provide means of this character that is effective and reliable in operation.

Still another object of the invention is to provide means of this character that is easy and quick to install so as to reduce the installation costs.

A further object of the invention is to provide means of this character adapted to operate in any position.

A still further object of the invention is to provide means of this character that is simple and sturdy in construction.

Another problem involved in providing a suitable actuator for plug valves is that there is a wide variation in the size of the stem and also in the distance from the center of the pipe to the top of the stem. It is therefore another object of the present invention to provide actuating means adapted to accommodate valve stems of various sizes such as are encountered in the plug valve field.

It is still another object of the invention to provide means of this character adapted to compensate for the distance from the center of the pipe to the top or free end of the valve stem.

A further object of the invention is to provide means of this character which may be remotely controlled.

A still further object of the invention is to provide means of this character that may be marketed as a package unit.

Another object of the invention is to provide means of this character that is relatively inexpensive to manufacture.

Other objects and advantages of the invention will appear from the following part of the specification.

Referring to the accompanying drawing which is for illustrative purposes only:

Fig. 1 is a top plan view of the actuating mechanism embodying the present invention as installed for use, a portion of the mechanism being broken away to show certain interior parts;

Fig. 2 is a side elevation of the same with a section broken away to show the interior of the cylinder;

Fig. 3 is a perspective of the pipe clamp assembly; and

Fig. 4 is an exploded perspective of the valve lever assembly showing the relationship of the various parts thereof.

Referring more particularly to the drawings, there is shown a pipe 10 having attached thereto a plug valve indicated generally at 11. The actuator mechanism includes a clamp assembly, indicated generally at 12, a cylinder and piston arrangement, indicated generally at 13, and a lever assembly, indicated generally at 14.

The plug valve 11 may be attached to the pipe 10 by any suitable means such as, for example, flange 15 which is secured to a flange 16 of the pipe by means of bolts 17. It is to be understood that the valve 11 is provided with a flange at the opposite side similar to the flange 15 for attachment to another pipe, the latter flange and pipe not being shown. From one end of the body 18 of the valve 11 a valve stem 19 extends and is provided adjacent the outer or free end with flattened diametrically arranged sides 20. Inasmuch as the interior construction of plug valves is well known, it is believed that such interior construction need not be shown or described herein.

The clamp assembly 12 comprises a hollow housing having top and bottom walls 22 and 23 respectively, side walls 24 and 25 respectively, a front wall 26, and a removable rear wall or cover 27 secured to the open end of the housing by means of screws 28.

At one side of the housing is a lateral extension 30 having a longitudinally extending recess 31 which is arcuate or concave in shape. The flange 30 comprises a clamp member with which a second clamp member 32 is adapted to cooperate for clamping the housing to the pipe 10. Clamp member 32 provided with a central portion 33 having a longitudinally extending concave or arcuate recess arranged oppositely of the recess 31, pipe 10 being received in the recesses. At each side of the central portion 33 is a longitudinally extending flange 34 having openings therein for reception of bolts 36 which extend through openings provided therefor in the flange 30 at the opposite sides of the recess 31 thereof. Nuts 37 on said bolts 36 provide tightening members. Thus the clamp assembly may be securely attached to the pipe 10.

Forward wall 26 of the clamp assembly housing is provided with a pair of laterally spaced forwardly projecting ears 40, provided with aligned openings for rotatable reception of a shaft 41 arranged parallel to the wall 26 and in forwardly spaced relation thereto. Means for securing the shaft 41 in the ears are provided and may be of any suitable character. As shown the shaft securing means comprises cotter pins 42 at the outer sides of the ears 40, said cotter pins being received in transverse openings provided therefor in the end portions of the shaft 41.

This arrangement of ears and shaft provide means for pivotally mounting one end of cylinder assembly 13 to the clamp assembly.

The cylinder and piston assembly comprises a hollow cylinder 45 having front and rear end members 46 and 47 respectively which are secured to the adjacent ends of the cylinder 45 by any suitable means such as, for example, screw threads, not shown.

Member 47 of the cylinder assembly has a rearwardly projecting ear 48 provided with an opening for reception of the shaft 41 and there is a set screw 49 threadably received in a tapped opening provided therefor in the ear 48 whereby the said ear 48 may be secured to the shaft 41 in various positions longitudinally of said shaft. This arrangement permits adjustment of the position of the cylinder assembly toward or away from the pipe 10 and in parallel relationship with said pipe.

Member 46 of the cylinder assembly has a forwardly projecting axial boss 50 with an axial bore therethrough for slidable reception of piston rod 51, Fig. 2, which carries piston 52 at its inner end. Any suitable packing or sealing means, not shown, may be used in the boss 50 for providing a seal between the piston rod and said boss so as to prevent escape of fluid from the forward end of the cylinder. The forward end of piston rod 51 extends outwardly of the boss 50 and is provided with a clevis 53 having a pair of forwardly extending laterally spaced ears 54 carrying a pin 55 secured therein by cotter pins 56 in the well known manner.

Means for protecting the piston rod from dirt and foreign material is provided and comprises an expansible and contractable boot 58 having one end secured at the boss 50 and the opposite end secured to the shaft 51 adjacent the clevis.

The lever assembly 14 includes a lever 60 that is generally elbow-shaped. An arm 61 of the lever 60 has an opening 61a adjacent its free end for operable reception of the clevis pin 55, said free end of arm 61 being received between the arms of the clevis. Arm 61 of lever 60 is in substantially longitudinal alignment with the piston rod 51 when the piston 52 is at its position adjacent the rear of the cylinder 45. The lever 60 includes an arm 62 at substantially right angles to the arm 61, there being an opening 63 adjacent the free end of arm 63 for reception of the outer or free end of the valve stem 19, said free end of the valve stem including flattened portions 20. There are a pair of lugs 65 on the arm 62, said lugs being at diametrically opposite sides of the opening 63 and having curved inner surfaces 66 in the plane of the adjacent portions of the opening 63. Lugs 65 project forward the body of the valve 18 and are provided with transverse threaded openings 67. The width of lugs 65 is less than the width of the flattened end portion of the valve stem 19, and are part of the means provided for clamping the free end of arm 62 to said valve stem 19. A clamping block 70 is provided for each side of the flattened end portion of the valve stem 19. Each block 70 has an opening 71 adjacent the respective ends for reception of bolts 72, said bolts 72 also extending through the respective openings 67 in the lugs 65, and nuts 74 secure the parts together. Each of the blocks 70 engages one of the flattened sides 20 of the valve stem 19 and clamps said valve stem operably to the free end of arm 62.

There is also means for providing and controlling fluid pressure to the cylinder 45 for actuating the piston so as to effect opening and closing of the plug valve. Fluid under pressure, such as air for example, is supplied from any suitable source, not shown, by way of conduit 80, which is connected to a 4 way solenoid valve 81. The conduit 80 is connected to a nipple 82 which extends through an opening provided therefor in the bottom wall 22. The nipple is screwed into the inlet of the solenoid valve 81 and a jam nut 83 on the nipple is turned against the wall 22 to thereby secure the valve. Valve 81 is provided with a connection for supplying fluid pressure to the rear end of the cylinder and said connection comprises a flexible tube 84 having a nipple and jam nut arrangement similar to that described above in connection with the conduit 80, for connecting said tube 84 with one of the valve parts. The other end of the tube 84 is provided with a fixture 85 connected in the usual manner with an opening provided therefor in the end member 47 of the cylinder assembly. A passage 86 in the member 47 connects the opening in member 47 with the interior of the cylinder at the rear end thereof so that fluid pressure may be applied to the rear face of the piston 52 to actuate said piston forwardly and thereby effect opening of the plug valve. The forward end of the cylinder 45 is connected with another valve port by means of a passage 88, pipe 89, and flexible tube 90. The tube 90 is connected to the valve 81 in substantially the same manner as conduit 80 and tube 84. Pressure supplied through tube 90 and pipe 89 effects rearward movement of the piston so as to close the plug valve.

An exhaust 91 is provided for the solenoid valve 81 and discharges within the housing of the clamp assembly 12. It is to be noted that the housing is not sealed tightly so that air discharged from the valve 81 may escape therefrom. The valve 81 is also provided with electrical connections carried in cable 92 for supplying electric energy to energize the coil of said valve 81, said cable entering the housing through an opening 93 provided therefor in the wall 26. Suitable switch controls, not shown, are used and these controls may be remotely located where desired.

In view of the fact that the valve 81 is of well known construction, the operating parts thereof are not shown. However, various well known arrangements may be used for the valve and the electrical controls. For example, in one of such arrangements, the solenoid valve parts will be in one operative position when the coil of the solenoid is deenergized and in another position when said coil is energized. When the coil is deenergized fluid pressure from the conduit 80 is transmitted through valve 81 to the tube 90, and the pipe 89 to the forward end of cylinder 45 to move the piston 52 to the rear end of the cylinder and effect closing of the plug valve 11. Under these conditions the rear of the cylinder will be vented to atmosphere through the tube 84, valve 81 and outlet 91.

When it is desired to open the plug valve 11, the solenoid coil is energized to thereby effect operation of the valve so that fluid pressure from the conduit 80 will be transmitted to the rear surface of the piston 52 by way of said valve 81, tube 84 and passage 86. At the same time the forward end of the cylinder 45 will be vented to atmosphere by way of passage 88, pipe 89, tube 90, valve 81 and outlet 91.

Forward movement of the piston 52 will actuate the lever 60 to effect rotation of the valve stem 19 and opening of the valve 11. The elbow-shape of the lever 60 causes the clevis 53 and piston rod with its protecting boot to clear the flanges 15 and 16, and thereby prevent injury of these parts and/or interference with the operation of the mechanism. As the piston moves forward or rearward, the cylinder will pivot on the axis of the shaft 41, and the flexibility of the tubes 84 and 90 will permit such free pivotal movement of the cylinder.

If, for any reason, it should become necessary or desirable to actuate the plug valve 11 by hand, such actuation may be effected by inserting a suitable rod or pipe, or the like, in the bore 95 of a lug 96 provided on the lever 60 adjacent the junction of the arms 61 and 62. The angular relationship of the bore 95 may vary, but it has been found that a convenient arrangement is to have the bore inclined upwardly and forwardly as shown in Fig. 2.

I claim:
1. Valve actuating mechanism for a plug valve attached to a pipe and having a stem projecting at right angles to said pipe, said stem being provided with flattened sides adjacent the free end thereof, comprising: a clamp assembly including walls defining a hollow housing having an open side; a cover removably attached to the housing and closing said open side; a clamp comprising a flange for said housing and extending laterally thereof, said flange having a longitudinally extending recess, said flange comprising one part of a clamp; a second clamp part having a longitudinal recess, said clamp being attached to said pipe with the pipe extending in said recesses; means securing the clamping members together; a shaft at the forward end of said housing; means pivotally mounting said shaft to the housing with said shaft at right angles to the pipe; a four way solenoid valve secured within the housing and having an inlet adapted to be connected to a source of fluid pres- sure and an outlet discharging within the housing; a cylinder extending parallel to said pipe; means connecting the rear end of the cylinder to said shaft so that said cylinder may be positioned on said shaft in various adjusted positions longitudinally thereof; means securing the pivotally connecting means in adjusted positions on said shaft; means connecting the solenoid valve with the front and the rear ends respectively of said cylinder for transmitting fluid pressure to said ends, said means including flexible parts; a piston within the cylinder; a piston rod connected to said piston and extending outwardly of the forward end of the cylinder; a clevis at the forward free end of the piston rod; an elbow-shaped lever having the free end of one arm pivotally connected to the clevis with said arm in substantially longitudinal alignment with the piston rod when the piston is at the rear of the cylinder, the other arm of said lever being at substantially right angles to the first mentioned arm and having an opening therein for reception of the free end of the valve stem; lugs extending laterally of the second mentioned arm adjacent the opening therein and toward the plug valve; blocks for each side of the lugs for engagement with the respective flattened sides of said valve stem; means securing said blocks to said lugs for clamping the lever to the valve stem; and a boss on said lever adjacent the junction of the arms, said boss having a bore therein for reception of an actuating tool.

2. Valve actuating mechanism for a plug valve attached to a pipe and having a stem projecting at right angles to said pipe, comprising: a clamp assembly including walls defining a hollow housing having an open side; a cover removably attached to the housing and closing said open side; a clamp comprising a flange for said housing and extending laterally thereof, said flange having a longitudinally extending recess, said flange comprising one part of a clamp; a second clamp part having a longitudinal recess, said clamp being attached to said pipe with the pipe extending in said recesses; means securing the clamping members together; a shaft at the forward end of said housing; means pivotally mounting said shaft to the housing with said shaft at right angles to the pipe; a solenoid valve secured within the housing and having an inlet adapted to be connected to a source of fluid pressure and an outlet discharging within the housing; a cylinder extending parallel to said pipe; means connecting the rear end of the cylinder to said shaft so that said cylinder may be positioned on said shaft in various adjusted positions longitudinally thereof; means securing the pivotally connecting means in adjusted positions on said shaft; means connecting the solenoid valve with the front and the rear ends respectively of said cylinder for transmitting fluid pressure to said ends, said means including flexible parts; a piston within the cylinder; a piston rod connected to said piston and extending outwardly of the forward end of the cylinder; a clevis at the forward free end of the piston rod; an elbow-shaped lever having the free end of one arm pivotally connected to the clevis with said arm in substantially longitudinal alignment with the piston rod when the piston is at the rear of the cylinder, the other arm of said lever being at substantially right angles to the first mentioned arm and having an opening therein for reception of the free end of the valve stem; lugs extending laterally of the second mentioned arm adjacent the opening therein; blocks for each side of the lugs at engagement with the valve stem; and means securing said blocks to said lugs for clamping the valve stem to the lever.

3. Valve actuating mechanism for a plug valve attached to a pipe and having a stem projecting at right angles to said pipe, comprising: a clamp assembly including walls defining housing; a clamp comprising a flange for said housing, said flange having a longitudinally extending recess, said flange comprising one part of a clamp; a second clamp part, said clamp being attached to said pipe; means securing the clamping parts together; a shaft pivotally carried by said housing at right angles to the pipe; a solenoid valve within the housing and having an inlet adapted to be connected to a source of fluid pressure and an outlet discharging within the housing; a cylinder extending parallel to said pipe; means connecting the rear end of the cylinder to said shaft and adjustable longitudinally of said shaft; means securing the last mentioned means to said shaft; means connecting the solenoid valve with the front and the rear ends respectively of said cylinder for transmitting fluid pressure to said ends, said means including flexible parts; a piston within the cylinder; a piston rod connected to said piston and extending outwardly of the forward end of the cylinder; an elbow-shaped lever having the free end of one arm pivotally connected to the forward end of said rod with said arm in substantial alignment with the piston rod when the piston is at the rear of the cylinder, the other arm of said lever being at substantially right angles to the first arm and having an opening therein for reception of the free end of the valve stem; and adjustable means for securing the last mentioned arm to the valve stem.

4. Valve actuating mechanism for a plug valve attached to a pipe and having a valve stem, comprising: a clamp assembly including means defining a housing; clamp means for attaching the housing to said pipe; a solenoid valve secured within the housing and having an inlet adapted to be connected to a source of fluid pressure and an outlet; a cylinder adapted to extend parallel to said pipe; means pivotally connecting one end of the cylinder to said housing; means providing fluid communication between the solenoid valve and the respective ends of said cylinder; a piston within the cylinder; a piston rod connected to said piston and extending outwardly of the other end of the cylinder; an elbow-shaped lever having the free end of one arm pivotally connected to the piston rod, the other arm of said lever being at substantially right angles to the first mentioned arm; and clamping means for the free end of said other arm for clamping said arm to the stem of said plug valve and comprising means adapted to accommodate stems of various sizes.

5. Valve actuating mechanism for a plug valve attached to a pipe and having a valve stem, comprising: a clamp assembly including means defining a housing; clamp means for attaching the housing to said pipe; a solenoid valve secured within the housing and having an inlet adapted to be connected to a source of fluid pressure and an outlet; a cylinder adapted to extend parallel to said pipe; means pivotally connecting one end of the cylinder to said housing; means providing fluid communication between the solenoid valve and respective ends of said cylinder; a piston within the cylinder; a piston rod connected to said piston and extending outwardly of the other end of the cylinder; an elbow-shaped lever having the free end of one arm pivotally connected to the piston rod, the other arm of said lever being at substantially right angles to the first mentioned arm; clamping means for the free end of said other arm for clamping said arm to the stem of said plug valve and adapted to accommodate stems of various sizes; and a boss on said lever adjacent the junction of the arms, said boss having a bore therein for reception of an actuating tool.

6. Valve actuating mechanism for a plug valve attached to a pipe and having a valve stem, comprising: a housing; means for securing the housing to said pipe; a solenoid valve within the housing and having an inlet adapted to be connected to a source of fluid pressure and an outlet; a cylinder adapted to extend parallel to said pipe; means pivotally connecting one end of the cylinder to said housing and providing means for adjusting the cylinder toward and away from said pipe; means providing communication between the solenoid valve and the front and the rear ends of said cylinder; a piston within the cylinder; a piston rod connected to said piston and extending outwardly of the other end of the cylinder;

an elbow-shaped lever having the free end of one arm pivotally connected to the piston rod; and means for securing the free end of the other arm of said lever to the stem of said plug valve.

7. In a mechanism for actuating a valve having a rotatable valve stem: a clamp; a cylinder; means pivotally connecting said cylinder to said clamp; means for adjusting said cylinder and clamp laterally relative to each other on an axis normal to the axis of the cylinder; a piston operably disposed in said cylinder; a piston rod connected to said piston and extending outwardly of one end of said cylinder; and an actuating lever connecting the extending end of said piston rod with said valve stem whereby movement of the piston in the cylinder will effect actuation of the valve.

8. In a mechanism for actuating a valve having a rotatable valve stem: a clamp; a cylinder; means pivotally connecting said cylinder to said clamp; a piston operably disposed in said cylinder; a piston rod connected to said piston and extending outwardly of one end of said cylinder; an actuating lever having one end connected to the extending end of said piston rod; and clamp means for the opposite end of said lever securing said lever to the valve stem, said clamp means being adjustable to accommodate valve stems of various cross-sectional sizes.

9. In a mechanism for actuating a valve having a rotatable valve stem: a clamp; a cylinder; means for pivotally connecting said cylinder to said clamp; a piston operably disposed in said cylinder; a piston rod connected to said piston and extending outwardly of one end of said cylinder; an elbow-shaped actuating lever having one end operably connected to the extending end of the piston rod; clamp means on the opposite end of said lever for securing said opposite end to said valve stem whereby movement of the piston in the cylinder will effect rotatable actuation of the valve, said clamp means being adjustable to accommodate valve stems of various cross-sectional sizes.

10. Valve actuating mechanism for a plug valve attached to a pipe and having a valve stem, comprising: a clamp assembly including means defining a housing; clamp means securing the housing to said pipe; a solenoid valve secured within the housing and having an inlet adapted to be connected to a source of fluid pressure and an outlet; a cylinder extending parallel to said pipe; means pivotally connecting one end of the cylinder to said housing; means providing fluid communication between the solenoid valve and the respective ends of said cylinder; a piston within the cylinder; a piston rod connected to said piston and extending outwardly of the other end of the cylinder; an elbow-shaped lever having the free end of one arm pivotally connected to the piston rod, the other arm of said lever being at substantially right angles to the first mentioned arm; and clamping means on the free end of said other arm clamping said arm to the stem of said plug valve and comprising means adapted to accommodate stems of various sizes.

11. Valve actuating mechanism for a plug valve attached to a pipe and having a valve stem, comprising: a clamp assembly including means defining a housing; clamp means securing the housing to said pipe; a solenoid valve secured within the housing and having an inlet adapted to be connected to a source of fluid pressure, and an outlet; a cylinder parallel to said pipe; means pivotally connecting one end of the cylinder to said housing; means providing fluid communication between the solenoid valve and the respective ends of said cylinder; a piston within the cylinder; a piston rod connected to said piston and extending outwardly of the other end of the cylinder; an elbow-shaped lever having the free end of one arm pivotally connected to the piston rod, the other arm of said lever being at substantially right angles to the first mentioned arm; clamping means for the free end of said other arm for clamping said arm to the stem of said plug valve and adapted to accommodate stems of various sizes; and a boss on said lever adjacent the junction of the arms, said boss having a bore therein for reception of an actuating tool.

12. Valve actuating mechanism for a plug valve attached to a pipe and having a valve stem, comprising: a housing; means securing the housing to said pipe; a solenoid valve within the housing, said valve having an inlet adapted to be connected to a source of fluid pressure, and an outlet; a cylinder substantially parallel to said pipe; means pivotally connecting one end of the cylinder to said housing and providing means for adjusting the cylinder toward and away from said pipe; means providing communication between the solenoid valve and the front and rear ends, respectively, of said cylinder; a piston within the cylinder; a piston rod connected to said piston and extending outwardly of the other end of the cylinder; an elbow-shaped lever having the free end of one arm pivotally connected to the piston rod; and means operably securing the free end of the other arm of said lever to the stem of said plug valve.

13. Valve actuating mechanism for a plug valve attached to a pipe and having a valve stem, comprising: a housing; means securing the housing to said pipe; a solenoid valve within the housing, said valve having an inlet adapted to be connected to a source of fluid pressure; a cylinder substantially parallel to said pipe; means pivotally connecting one end of the cylinder to said housing and providing means for adjusting the cylinder toward and away from said pipe; means providing communication between the solenoid valve and the front and rear ends, respectively, of said cylinder; a piston within the cylinder; a piston rod connected to said piston and extending outwardly of the other end of the cylinder; a lever having the free end of one arm pivotally connected to the piston rod; and means operably securing the free end of the other arm of said lever to the stem of said plug valve.

References Cited in the file of this patent

UNITED STATES PATENTS

| | | |
|---|---|---|
| 471,725 | Wallgren | Mar. 29, 1892 |
| 988,864 | Cravens | Apr. 4, 1911 |
| 1,763,640 | Cooper | June 17, 1930 |
| 2,023,951 | Cohan | Dec. 10, 1935 |
| 2,108,331 | Graves | Feb. 15, 1938 |
| 2,575,964 | MacLean | Nov. 20, 1951 |
| 2,577,260 | Moore | Dec. 4, 1951 |

FOREIGN PATENTS

| | | |
|---|---|---|
| 355,239 | Germany | June 6, 1922 |
| 668,525 | France | of 1929 |